United States Patent Office 3,474,253
Patented Oct. 21, 1969

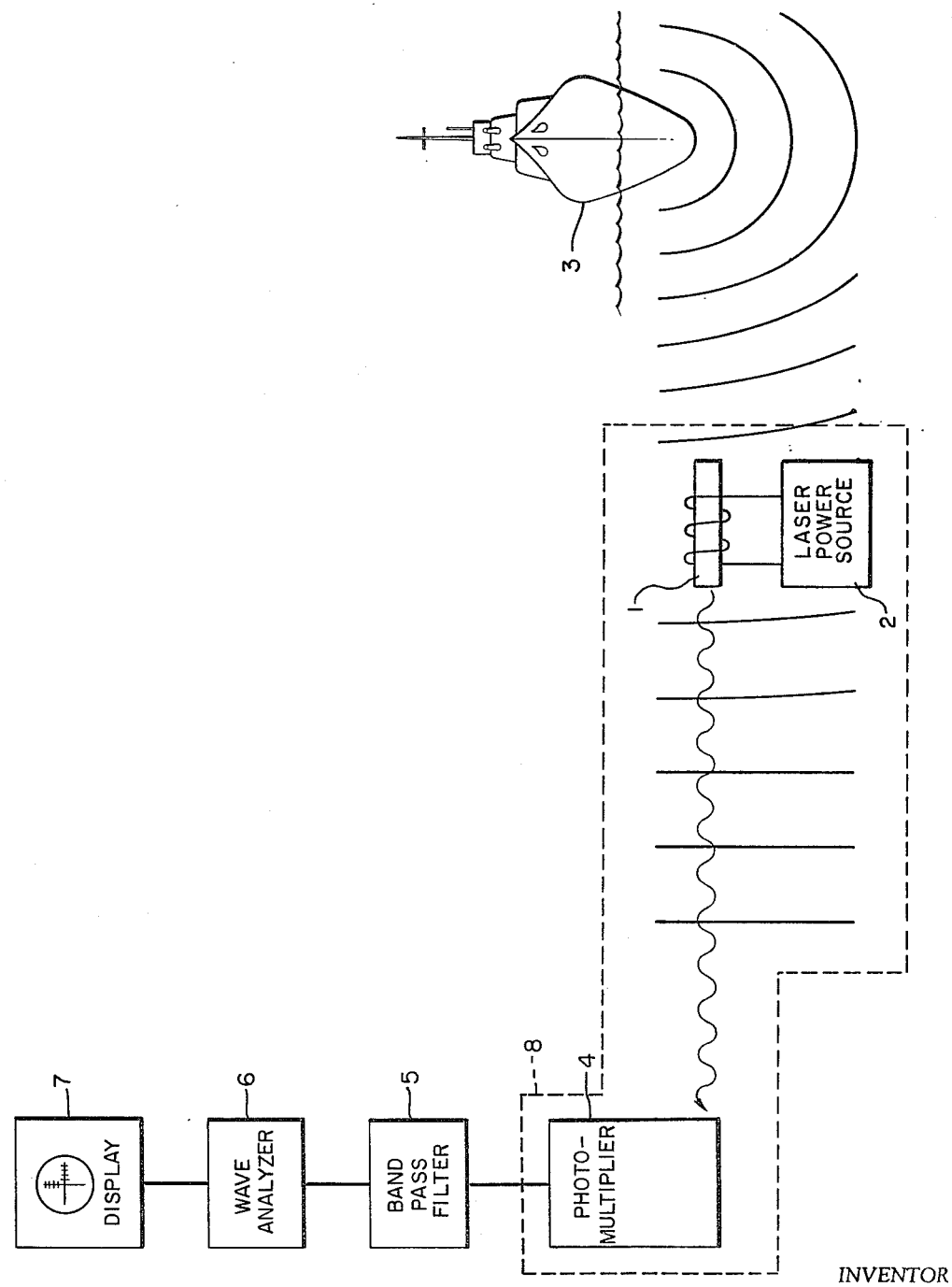

3,474,253
METHOD AND APPARATUS FOR OPTICALLY DETECTING ACOUSTIC DISTURBANCES
Bernard V. Kessler, Greenbelt, Md., assignor to the United States of America as represented by the Secretary of the Navy
Filed June 2, 1966, Ser. No. 554,904
Int. Cl. H01j 39/12; G01n 21/26; G02f 1/28
U.S. Cl. 250—217                    5 Claims The invention described herein may be manufactured and used by or for the Government of the United States of America for governmental purposes without the payment of any royalties thereon or therefor.

This invention relates generally to a method and apparatus for optically detecting acoustic disturbances, and more particularly to the detection of underwater acoustic waves such as those that emanate from ships and the like by means of laser beams and associated optical detection and electronic processing equipment. The apparatus according to the invention may be descriptively termed an "optical hydrophone."

The older methods of detecting underwater acoustic waves have been by means of conventional hydrophones; that is, devices in which the acoustic energy mechanically moves a transducer which in turn generates a voltage at the acoustic frequency, usually in the low audio region of 25 to 1,000 cycles per second. The sensitivity of a good conventional hydrophone is about $-80$ db referred to a level of 1 dyne/cm.$^2$. The useful sensitivity of a hydrophone is essentially noise background limited. Typical angular directivities of hydrophones of reasonable size are a few degrees. Although conventional hydrophones have in the past served the purpose, they have become increasingly inadequate under certain conditions of modern warfare. Specifically, there has arisen the need for an acoustic detection device having a much narrower directivity pattern and a greater discrimination against noise than heretofore obtainable.

It is therefore an object of the instant invention to provide a method of optically detecting underwater acoustic disturbances.

It is another object of this invention to provide a method of detecting underwater acoustic waves which is more sensitive and much more directional than prior techniques.

It is a further object of the invention to provide an "optical hydrophone" which has increased sensitivity, greater discrimination against noise and improved directivity as compared with conventional hydrophones of, for example, the electrodynamic or piezoelectric variety.

It is yet another object of this invention to provide a device which detects acoustic disturbances in water, particularly those emanating from ships, optically and is characterized by an extremely narrow directivity pattern.

According to the present invention, the foregoing and other objects are attained by providing a laser, a photomultiplier coupled to the laser by an underwater optical path, and electronic signal processing equipment connected to the output of the photomultiplier. The basic operating principle of the invention is that low frequency acoustic disturbances Brillouin scatters a laser beam in the forward direction. Furthermore, Brillouin scattering of a light ray from a Debye wave, i.e., a thermal acoustic wave, is incoherent whereas Brillouin scattering from a coherently generated acoustic wave such as from a ship results in a coherent, scattered optical wave. The original laser beam, unshifted in frequency, is heterodyned with the Brillouin shifted components at the photomultiplier. The electronic signal processing equipment receives the output signal from the photomultiplier and discriminates the ship's acoustic signature as determined by coherent Brillouin scattering from background noise including incoherent signals resulting from scattering from Debye waves.

The specific nature of the invention, as well as other objects, aspects, uses and advantages thereof, will clearly appear from the following description and from the accompanying drawing in which the sole figure is a block diagram of the preferred embodiment of the optical hydrophone according to the invention.

Brillouin scattering results from the interaction of a light wave with an acoustic wave. The frequency shift experienced by a beam of light due to Brillouin scattering in water may be expressed as follows;

$$\Delta \nu = 2n(V_q/c)\nu \sin \theta/2$$

where $\nu$ is the frequency of the light, $n$ is the refractive index of light in water, $V_q$ is the speed of sound in water, $c$ is the speed of light in vacuum, and $\theta$ is the angle between incident and scattered light beams. Since the acoustic signatures of ships are in the low audio range, $\Delta \nu = 50$ to 1,000 cycles per second, the scattering angle $\theta$ is exceedingly small, and the scattered Brillouin light remains essentially in the beam, only its frequency having been changed slightly. For example, for an acoustic frequency of 10,000 cycles per second, which is the maximum frequency of interest, the scattering angle $\theta \simeq 10^{-5}$ radians. The transverse displacement is negligible for path lengths in water up to a few hundred feet.

Referring now to the drawing, the present invention employs the phenomenon of Brillouin scattering to detect coherent acoustic disturbances in water by providing a CW laser 1 driven by a suitable source of power 2. The light from the laser 1 is propagated into the water medium where it interacts with acoustic waves emanating from ship 3. Scattered and unscattered laser rays then impinge upon the photocathode of a photomultiplier 4 which is substantially on the axis of the laser beam. Photomultiplier 4 acts like a square-law detector and generates a beat frequency between the original laser frequency and the Brillouin frequency-shifted components. Thus, the output of the photomultiplier 4 is the amplified beat note comprising the audio range of the ship's signature. To discriminate among the ship's acoustic signature as determined by coherent Brillouin scattering, incoherent scattering from thermal Debye waves, and acoustic background noise in the water which might also produce some Brillouin scattering, a bandpass filter 5 followed by a wave analyzer 6 receives the output of photomultiplier 4. The bandpass filter 5 eliminates all frequency components of the photomultiplier signal which are not within the expected spectrum of the ship's acoustic signature. The wave analyzer 6 may employ a phase sensitive detector or electronic correlation circuitry which discriminates against the incoherent beat frequencies arising from thermal Debye waves in favor of coherent beat notes which are derived from the ship's acoustic disturbance. The output of wave analyzer 6 is connected to display 7 which provides a suitable visual indication of a detected acoustic disturbance. Display 7 may include a CRT such as is common in sonar systems and the like which provides a suitable indication of the ship's signature. The laser 2 and photomultiplier 4 are preferably mounted on a common platform within a structure that may be rotated in the water so that the direction of ship 3 can be unambiguously established. This common mounting is indicated by the dotted line 8.

As was previously mentioned the optical hydrophone according to the invention must discriminate against Brillouin scattering due to thermal phonons (Debye waves) in the spectral range of interest, i.e. 50 to 1,000 cycles per second. Such discrimination is readily achieved by correlation and phase-lock electronic techniques. This is done on the principle that the coherence time of thermal phonons in water is less than $10^{-10}$ seconds whereas acoustic disturbances from ships produce much larger coherence times. The coherence times for the Brillouin scattered light is the same as the respective phonon's coherence time it scatters off of.

The greater usefulness of the optical hydrophone is due to a number of factors. For audio phonons not much energy is required to Brillouin scatter, i.e. change the frequency, of a laser photon in a single photon-phonon collision. For a phonon frequency, $\nu_{phonon}$, of 1,000 cycles per second, the phonon energy is $h\nu_{phonon} = 3 \times 10^{-12}$ e.v. The presence of a phonon is detected, however, by the beat frequency of photons of energy approximately equal to 2.0 e.v. Assume a strong laser local oscillator signal, the original unscattered beam, is present. The photon flux required to define a 1,000 cycle beat note is calculated as follows: First, there must be at least about 5,000 photoelectrons per second to define a 1,000 cycle signal. For a twenty percent photocathode quantum efficiency (S-20 surface, green light), the required minimum photon flux is about 25,000 Brillouin photons per second or approximately equal to $10^{-13}$ watts. This is well within the detachability levels of current photomultipliers, particularly if cooled to $-60°$ C. Although the scattering efficiency of the Brillouin process is low, the interaction occurs over the entire path length of the underwater laser beam, and the effect is additive. The Brillouin scattered photons are scattered through such small angles, $\theta < 10^{-7}$ radians, that they are all collected at a photocathode of just an inch or two in diameter.

The directivity, which is determined chiefly by the Brillouin scattering angle or $10^{-7}$ radians, of the optical hydrophone is many times better than that of conventional hydrophones. Thus, if the laser and photomultiplier are slowly rotated the beat signal from the ship will be observed only when the laser beam is almost exactly aligned with the propagation vector of the ship's acoustic disturbance. This directionality affords great discrimination against background noises in the same audio region of interest since the background noises are isotropically distributed in space. There will, of course, be a certain amount of beamspreading of the laser beam from refractive index variations, thermal gradients and other causes; but for a photocathode diameter of five inches, the diameter of the beam will still be less than that of the photocathode even after the beam has traversed an underwater path length of about one hundred feet.

The photomultiplier is sensitive to extremely low photon fluxes. A cooled photomultiplier can detect fluxes as low as ten photons per second. Somewhat higher photon fluxes are required when beats between two optical frequencies are desired. The gain of a photomultiplier is as high as $10^8$ and is less noisy than any electronic amplifier available. Also, since low audio frequencies are of particular interest, a large valued photomultiplier load resistor may be used for great detection sensitivity. The homodyne or self-beating technique of heterodyning eliminates or minimizes some possible sources of error of this invention. For instance, thermal or microphonic vibrations of the laser cavity-mirrors will cause the output frequency of the laser to jump about. Power supply and plasma discharge instabilities, water currents, longitudinal motion of the laser with respect to the detector, will all cause real or apparent frequency shifts of the laser. However, since the instantaneous laser frequency is made to beat with itself shifted by Brillouin scattering, these effects are canceled.

Multi-longitudinal mode lasers having higher power than single-longitudinal mode lasers may be used. This is because the modes are spaced many megacycles apart in frequency. Thus, each longitudinal mode beats with itself only. The undesirable beat frequencies are eliminated by bandpass filter 5.

Beat signals at low audio frequencies are apt to be noise limited since low frequency noises are high in electronic circuits. An alternate arrangement would be to raise the frequency of the laser beam a convenient amount, for example 30 kc., by Bragg acoustic-modulation tanks and use this as the laser local oscillator signal. The information would then be at a frequency of 30 kc. plus the audio. This signal may be readily processed by low-noise intermediate frequency amplifiers.

Instead of conventional phase-lock or electronic correlators, the use of a photon correlation device (Brown-Twiss experiment) could serve the same purpose.

In addition, a more compact structure may be achieved by employing a folded optical path between the laser and the photomultiplier. This, however, introduces a directional ambiguity into the system.

It will be apparent that the embodiment shown is only exemplary and that various modifications can be made in construction and arrangement within the scope of the invention as defined in the appended claims.

I claim as my invention:

1. A method of detecting underwater coherent acoustic waves comprising the steps of
    propagating a narrow beam of light through a water medium,
    detecting the Brillouin scattered light along the forward axis of the narrow beam of light,
    beating the Brillouin scattered light with the unscattered light to produce beat frequencies, and
    discriminating the coherent beat frequencies from incoherent and randomly occurring beat frequencies.

2. A method of detecting underwater acoustic waves such as those that emanate from ships and the like comprising the steps of
    propagating beam of light from a laser into the water,
    combining the Brillouin scattered light along the forward axis of the laser beam with unscattered light from the laser to produce audio beat frequencies which represent the ship's acoustic signature.

3. The method as recited in claim 2 further comprising the step of correlating the beat frequency to discriminate among the ship's acoustic signature as determined by coherent Brillouin scattering, incoherent scattering from thermal waves, and acoustic background noise in the water which might also produce some Brillouin scattering.

4. An apparatus for detecting acoustic disturbances in water optically, comprising:
    a laser,
    a photomultiplier positioned substantially along the forward axis of a beam of light emitted by said laser, said photomultiplier being coupled to said laser by an underwater optical path, and
    electronic signal processing equipment means connected to the output of said photomultiplier to discriminate signals determined by coherent Brillouin scattering from background noise including signals resulting from scattering from Debye waves.

5. An apparatus as recited in claim 4 wherein said electronic signal processing equipment comprises
    a bandpass filter, and
    a wave analyzer.

References Cited

UNITED STATES PATENTS

| | | | |
|---|---|---|---|
| 3,153,236 | 10/1964 | Rines | 340—6 |
| 3,278,753 | 10/1966 | Pitts et al. | 340—4 |
| 3,350,654 | 10/1967 | Snitzer | 250—217 |

OTHER REFERENCES

Cruft Laboratory Report, Oct. 19, 1959, pages 13–15 relied upon.

RALPH G. NILSON, Primary Examiner

C. LEEDOM, Assistant Examiner

U.S. Cl. X.R.

250—218; 340—4